United States Patent
Hoover et al.

(10) Patent No.: US 6,586,355 B2
(45) Date of Patent: *Jul. 1, 2003

(54) SLAGLINE SLEEVE FOR SUBMERGED ENTRY NOZZLE COMPOSITION THEREFORE

(75) Inventors: Donald B. Hoover, York, PA (US); Franklin A. Renda, York, PA (US); Donald J. Griffin, York, PA (US); Colin Richmond, Ripon (GB)

(73) Assignee: Baker Refractories, York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/022,400

(22) Filed: Dec. 20, 2001

(65) Prior Publication Data

US 2002/0177517 A1 Nov. 28, 2002

Related U.S. Application Data

(63) Continuation of application No. 09/147,487, filed as application No. PCT/US97/11179 on Jul. 8, 1997, now Pat. No. 6,410,469.
(60) Provisional application No. 60/021,406, filed on Jul. 9, 1996.

(51) Int. Cl.⁷ .......................... C04B 35/52; C04B 35/482
(52) U.S. Cl. .................... 501/101; 501/102; 501/103; 501/104; 222/566; 222/630; 264/669; 264/670; 264/29.1; 264/30; 264/269

(58) Field of Search ............................. 501/101, 102, 501/103, 104; 222/566, 630; 264/669, 670, 29.1, 30, 269

(56) References Cited

U.S. PATENT DOCUMENTS

| | | | |
|---|---|---|---|
| 5,046,647 A | 9/1991 | Kawai et al. |
| 5,083,687 A | 1/1992 | Saito et al. |
| 5,185,300 A | 2/1993 | Hoggard et al. |
| 5,198,126 A | 3/1993 | Lee |
| 5,250,479 A | 10/1993 | Rancoule et al. |
| 5,335,833 A | 8/1994 | Rancoule |
| 5,370,370 A | 12/1994 | Benson |

FOREIGN PATENT DOCUMENTS

JP 3-295858 12/1991

*Primary Examiner*—Karl Group
(74) *Attorney, Agent, or Firm*—Bacon & Thomas

(57) ABSTRACT

An improved submerged entry nozzle is provided which is useful in the casting of aluminum killed molten steel. The nozzle has an improved slagline sleeve or collar which surrounds the outer portion of the nozzle to protect it from corrosion during the casting process. The slagline sleeve is made from resin bonded zirconia/graphite which has been formulated so that upon curing of the resin to form resite, there is a reduction in the contractile tendency which results in a reduction in stress fracturing. The reduction of the contractile tendency and the resulting resistance to stress fracturing is achieved by adding an effective amount of calcium oxide to the resin-zirconia-graphite mixture which is used to form the sleeve.

18 Claims, 1 Drawing Sheet

SLAGLINE SLEEVE FOR SUBMERGED ENTRY NOZZLE COMPOSITION THEREFORE

This application is a continuation of application Ser. No. 09/147,487 filed on Aug. 11, 1999 now U.S. Pat. No. 6,410,469, which is the U.S. National Stage application of PCT/US97/11179 filed on Jul. 8, 1997, claiming priority under 35 U.S.C. §119 of U.S. provisional application No. 60/021,406 filed on Jul. 9, 1996.

BACKGROUND OF THE INVENTION

1. Field of the Invention

The present invention relates to refractory submerged entry nozzles which are used in the continuous casting of aluminum killed molten steel. More particularly this invention pertains to an improved sleeve or collar which surrounds the outer portion of the nozzle to protect it from the corrosive effects of molding powder which floats on the surface of the molten metal contained in the continuous casting mold through which the nozzle is partially immersed. This invention also pertains to the refractory composition which is used to make the improved sleeve or collar.

2. Background Art

It is common practice in continuous casting operations to employ a layer of mold powder above the metal surface in the mold in order to capture and prevent the entry of non-metallic inclusions into the molten metal. In addition, the mold powder serves as a lubricant and provides surface protection for the strand of solidified metal as it leaves the mold during a continuous casting procedure. Commonly used mold powders are comprised of a mixture of oxides which have a relatively low melting point and which form a molten slag layer which floats on the surface of the molten metal within the mold. In continuous casting procedures, it is common for the nozzle, through which the molten metal passes, to be slightly submerged in the top layer of the molten metal in the mold. Thus, a portion of the nozzle comes in contact with the slag layer of molding powder which floats on the surface of the molten metal. The area of the nozzle which comes in contact with the floating molding powder is commonly referred to as the slagline or powder line area. This zone of the nozzle which comes in contact with the molding powder undergoes chemical corrosion at a high rate due to the highly corrosive nature of the molding powder. Therefore, in order to protect the portion of the nozzle which comes in contact with the highly corrosive molding powder, it is conventional to provide a sleeve or collar of corrosion resistant material around the portion of the nozzle which comes in contact with the corrosive molding powder. Such nozzles are described in U.S. Pat. Nos. 5,185,300; 5,083,687; 5,348,202; 5,198,126 and 5,046,647, the specifications of which are incorporated herein by reference.

Conventional sleeves or collars are usually confined to the slagline portion of the nozzle. The sleeve is usually confined to this particular portion of the nozzle in order to reduce manufacturing costs. Thus, while it is preferred to confine the sleeve to this narrow zone, this confinement is not essential to the present invention and the sleeve may extend along the entire length or any portion thereof so long as it is present in at least the portion of the nozzle which comes in contact with the molten slag of mold powder which floats on the surface of the molten metal in the mold.

The nozzles to which this invention pertains are sometimes referred to in the art as refractory tubes or shrouds and the like. Therefore, the use of the term "nozzle" as used in this invention pertains to nozzles, tubes, shrouds and the like which are used in continuous casting procedures. Thus, the term "nozzle" as used herein is inclusive of such conventional refractory tubes, shrouds, and the like which are conventionally used in continuous casting of molten steel. Such nozzles and the use thereof is conventional in the technical field of this invention and are exemplified in U.S. Pat. Nos. 5,046,647; 4,568,007; 5,244,130 and 4,682,718, the specifications of which are incorporated herein by reference.

It is well known in the art that aluminum killed steels tend to form obstructions in conventional alumina-graphite pouring tubes and nozzles. A solution to this problem is described in U.S. patent application Ser. No. 08/432,708, the disclosure of which is incorporated herein by reference. In the aforementioned patent application, the nozzle or tube is made from doloma-graphite which prevents unwanted clogging. However, the doloma-graphite material from which the nozzle is fabricated, is easily corroded by the corrosive molding powder discussed above. Nonetheless, such molding powders are considered to be essential since they perform many useful functions in the continuous casting process. In particular, the mold powder acts as insulation which minimizes radiational and convective heat losses and acts as a lubricant to assist the motion of the steel in the mold and acts as an oxidation barrier to prevent ingress of oxygen. In addition, the mold powder functions to cause some metallurgical refining.

The corrosive action causes erosion of the doloma in the doloma-graphite tube or nozzle. Thus, doloma-graphite tubes are also fabricated with sleeves or collars as discussed above.

Such sleeves or collars are conventionally made of materials which resist the corrosive effect of the mold powder. One of the most useful materials for making such sleeves is refractory material containing zirconium oxide. Such sleeves made from zirconium oxide containing refractory material are described in U.S. Pat. Nos. 5,198,126; 5,348,202; 5,083,687 and 5,185,300. Typically these sleeves are made from wear-resistant refractory material which is zirconium oxide/graphite. The zirconium oxide (zirconia)/graphite is conventionally bonded with a binding resin (e.g., phenolic resin) and co-pressed into the outer portion of the nozzle in a narrow zone so as to form the sleeve. The resin is cured thereby converting the resin to resite. The methodology for making conventional zirconia/graphite slagline sleeves on submerged entry nozzles (e.g., nozzles made from alumina-graphite) is disclosed in the article by Sugie et al. entitled "Submerged Nozzles for Continuous Casting of Steel" published in Taikabutsu Overseas, Vol. 1, No. 2, page 78. As noted in this article a zone of zirconium oxide and graphite bonded with phenolic resin is co-pressed into an alumina-graphite tube to produce the sleeve.

When this approach is used with tubes made from doloma-graphite, the forces generated during the conversion of the resin to the resite are expansile in the doloma-graphite body and are contractile in the zirconium oxide-graphite sleeve portion of the body. Since the doloma-graphite body is interior to the zirconium oxide/graphite sleeve portion, the resultant stresses causes fracturing in and around the zirconium oxide-graphite sleeve. Such fracturing is obviously harmful to the structural integrity of the nozzle and is particularly harmful to the structural integrity of the sleeve. Therefore, there is a need in the art to prevent the fracturing which occurs due to the contractile forces generated by the curing resin in the zirconium oxide-graphite sleeve and the expansile forces generated by the curing resin in the doloma-graphite nozzle.

SUMMARY OF THE INVENTION

It is an object of this invention to prevent the stress fractures which occur when the resin in the doloma/graphite body of a submerged entry nozzle and the resin of a zirconia/graphite slagline sleeve located around the outer portion of the nozzle is converted from resin to rezite during a curing process which is used to fabricate the nozzle.

It is also an object of this invention to provide a doloma/graphite submerged entry nozzle having a zirconia/graphite slagline sleeve which resists stress fracturing during curing of the resin contained in the doloma/graphite nozzle and the zirconia/graphite sleeve.

It is also an object of this invention to provide resin bonded zirconia/graphite which has reduced contractile tendency when the binding resin is cured and converted from resin to resite.

These and other objects are achieved by adding an effective amount of calcium oxide (CaO) to the zirconium oxide/graphite material which is used to form the sleeve. The calcium oxide may be in the form of dead burned lime or doloma (calcined sintered dolomite). It is theorized that the binding resin used with the zirconium oxide/graphite liberates a small amount of water during the curing procedure and this water escapes thus causing a loss in volume of the resin when the resin is converted to the resite. In contrast, when this same resin liberates a small amount of water in the presence of the doloma contained in the main body of the nozzle, the doloma forms a hydrate which has a larger volume.

The calcium oxide, either in the form of dead burned lime or doloma is included in the resin-zirconium oxide-graphite mixture which is used to form the sleeve. It is theorized that the inclusion of calcium oxide in the resin-zirconium oxide-graphite material is sufficient to counteract the contractile tendency because the water which becomes liberated during the curing process of the resin causes hydration of the added calcium oxide which in turn causes an increase in the volume of the calcium oxide. The hydrated calcium oxide which is formed during the curing of the resin, has a higher volume and thereby counteracts the contractile tendency. Thus, the amount of calcium oxide which is added to the resin-zirconium oxide-graphite material should be sufficient so that the hydrated calcium oxide which is formed during the curing is enough to counteract the contractile tendency associated with the resin cured zirconium oxide-graphite material. Preferably the amount of calcium oxide, either as dead burned lime or doloma, is added in an amount from 0.25% by weight to 10% by weight based upon the amount of zirconium oxide and graphite which is used to form the sleeve.

Typically the zirconium oxide which is used to form the sleeve is stabilized with calcium oxide or magnesium oxide. The calcium oxide or magnesium oxide which is used to stabilize the zirconium oxide becomes part of the crystalline structure of the zirconium oxide. The calcium oxide which is used for the present invention is distinct from the stabilizing calcium oxide which becomes part of the crystalline structure of the zirconium oxide. The calcium oxide which is used in this invention for counteracting the contractile nature of the resin bonded zirconium oxide/graphite material is added as a separate powder and therefore exists as particles which are separate or distinct from the calcium oxide stabilized zirconium oxide.

DETAILED DESCRIPTION OF THE INVENTION AND PREFERRED EMBODIMENTS

Figure 1:
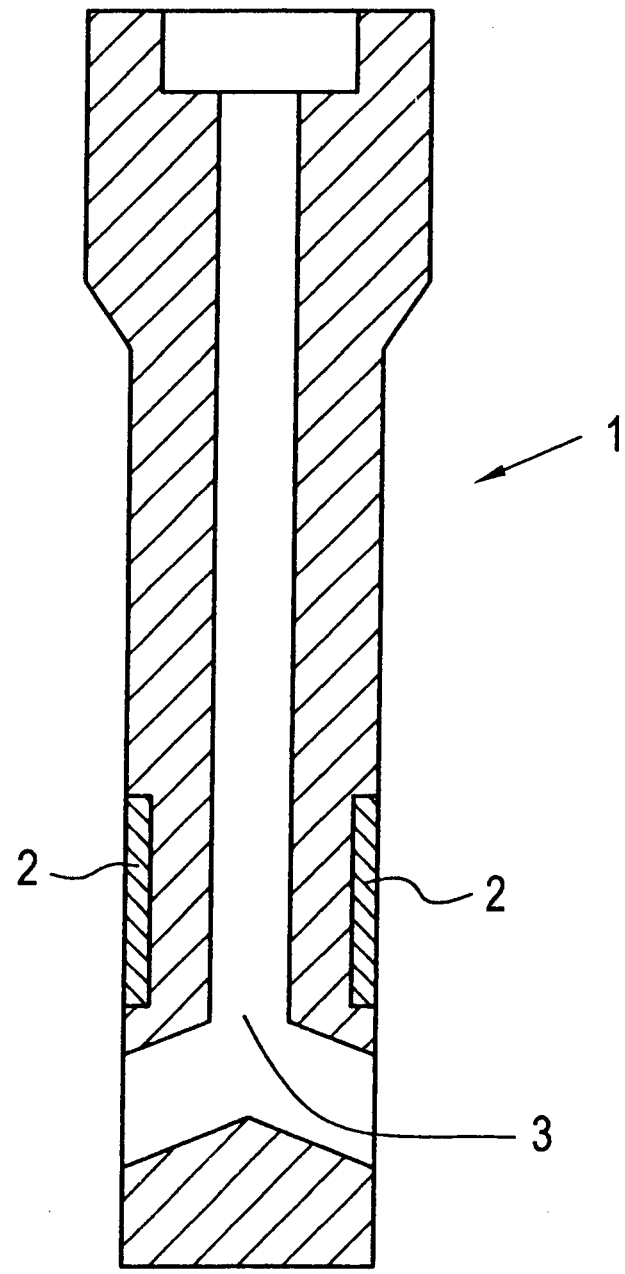
FIG. 1 is a cross section of a conventional submerged entry nozzle which shows the location of a slagline sleeve.

FIG. 1 shows the configuration of a conventional submerged nozzle indicated generally by reference numeral 1. The nozzle includes sleeve 2 which is made from zirconia/graphite. A bore 3 extends through the nozzle for the passage of molten steel therethrough. The sleeve 2 is conveniently limited to the slagline portion of the nozzle. However, as noted above, it is not essential to confine the sleeve to the narrow zone around the slagline. In fact, the sleeve may extend along the entire length or any portion thereof so long as it is present in at least a portion of the nozzle which comes in contact with the molten slag of mold powder which floats on the surface of the molten metal in the mold.

The carbon bonded doloma/graphite nozzle for which the sleeve of the present invention is particularly useful is made from a resin bonded blend containing doloma refractory and graphite, particularly flake graphite. The doloma, resin and graphite are mixed and molded into the desired shape of the nozzle, the resin is cured and then the formed nozzle is heated under carbonizing conditions to convert the resin binder into a carbon matrix. Thus, the nozzle contains graphite and doloma within a carbon matrix or network derived from the binder resin by heating the resin under carbonizing conditions.

Calcined sintered dolomite, known as doloma, is a well known commercially available refractory material which is currently used for a variety of refractory applications due to its heat resistant capability. It is made by calcining dolomite ($CaCO_3 \cdot MgCO_3$) to convert the $MgCO_3$ to $MgO$ and the $CaCO_3$ to CAO. Sintering is then performed on the calcined dolomite to densify the grain.

The carbon bonded doloma/graphite nozzle is made by mixing doloma powder with graphite, preferably flake graphite, with sufficient liquid resin binder to form agglomerates. Generally, 9–13% by weight, preferably about 9½–10½% by weight of liquid resin binder (based on the weight of the solids blend) is sufficient to form agglomerates in the mixing process.

The agglomerates are pressed isostatically in a mold at ambient temperature to shape the material into the desired form. The shaped mass is baked in a curing oven where the temperature is gradually increased to harden (cure) the resin. Next the formed mass is carbonized (coked) in a furnace at a carbonizing temperature greater than 850° C. (e.g., 1800–2400° F.) in an inert gaseous atmosphere which is unreactive with the resin (e.g., nitrogen or argon) to fully carbonize the resin and form a carbon network or matrix which holds the doloma and graphite together.

Resins which have sufficient green strength to bind the refractory materials and which can be carbonized to form a carbon network are well known to those skilled in the art. Many synthetic resins are known to be useful for forming refractory materials such as nozzles and can be used in the present invention. In general, it is known that these resins form a carbon network after the carbonizing or coking step. The carbon network holds the article together so that it resists breaking. Thus, the amount of resin should be enough to provide a sufficient amount of carbon network to accomplish this well known objective. Excessive amounts of carbon network should be avoided. Thus, it is preferable that the amount of carbon network should be no more than the amount which is required to hold the finished article together so that it resists breaking. Generally, the carbon network constitutes 4–7 wt. % of the finished nozzle, preferably about 5–6% (e.g., 6%).

If solid resin is used, it should be dissolved in a solvent to form a liquid binding resin composition. Typically, resins which are known for use in forming nozzles have a high coking value in the range of about 45%–50% to produce sufficient carbon network after carbonization. Also, curing the resin should avoid a condensation reaction since the water produced by such a reaction would be expected to react with the calcium oxide in the doloma to produce the corresponding hydroxide which occupies a higher volume and thereby causes the structure to come apart. Thus, resins which are known for use with other calcium oxide containing refractory materials can be used. The binding resin will produce a carbon network after the carbonizing or coking step which is sufficient so that the nozzle resists breaking. It is known that some weight loss of the resin occurs during the carbonization step. This weight loss results in some open porosity. Ideally, the weight loss which accompanies the thermal treatments does not result in an open porosity greater than 16%.

A preferred resin is phenol-formaldehyde resin. Such resins are well known and are produced by the reaction of phenol and formaldehyde. Preferably, the resin system contains formaldehyde and phenol in a ratio of 0.85 formaldehyde to phenol. The reaction between the phenol and formaldehyde is normally acid catalyzed so that the resulting resin must be buffered, dewatered and have the free phenol adjusted. The preferred levels are pH about 7.0, water below 0.1% and free phenol between 0.2–0.9%. The resin should then be put into solution with solvent. Suitable solvents include primary alcohols such as methyl, ethyl, isopropyl and furfuryl alcohol; glycol such as ethylene glycol; ketones such as methyl ethyl ketone and methyl isobutyl ketone; aldehyde such as furfuraldehyde and acetaldehyde; dibasic esters and dimethyl formamide. Preferably the solvent is a furan compound, preferably furfuraldehyde or a solution of furfuryl alcohol and furfuraldehyde. In practice, the resin solution includes a basic co-reactant such as triethylene tetramine, diethylene tetramine, ethylene diamine or tetraethylene pentamine. Other suitable co-reactants include diamines having an amine value of 1000±100 and the equivalent molecular weight of 30±2.

As an alternative to the B staged phenolic novolak-furfural solution, the invention may use a phenolic novolak dissolved in glycol and methyl alcohol but this resin is less desirable.

Another alternative binder system involves the use of furfural and a powdered phenolformaldehyde resin, mixed until the furfural picks up the solid, powdered resin and the resulting plasticized resin then causes the raw materials to roll up into agglomerates. A tumble dryer is subsequently used to densify the agglomerates. This process results in agglomerates with excellent properties.

The graphite used is preferably natural flake graphite with a carbon content of not less than about 94%. Preferably the flake size should be described by a normal distribution curve centering around 250 microns. Although minor amounts of impurities may be tolerated in the graphite, it is preferable to minimize such impurities. Preferably the graphite should be substantially free from contaminates and residual flotation compounds and the water content should be less than 0.5%. An analysis of a preferred flake graphite is shown in Table 1.

TABLE 1

| Specie | wt. % |
| --- | --- |
| Carbon | 95 ± 1 |
| CaO | 0.15 |
| MgO | 0.06 |
| $Al_2O_3$ | 0.87 |
| $SiO_2$ | 2.7 |
| $Fe_2O_3$ | 1.0 |
| Other | 0.22 |

The graphite is in the form of a powder so that it can form agglomerates with the doloma powder and resin and so that these agglomerates can then be molded into a fixed shape for carbonization. Preferably the particles are 0.044–0.3 mm in diameter.

The doloma is also in the form of a powder which can form agglomerates with the graphite and resin. Preferably the doloma is small enough to pass through a 14 mesh screen and large enough to be held on a 100 mesh screen (U.S. standard mesh). However, when screening the doloma to obtain the appropriate size range, it is not absolutely necessary to remove all of the material which would pass through the 100 mesh screen. For example, it is acceptable to include up to about 10 wt. % of the fines which would eventually pass through the 100 mesh screen if the screening process were continued for a very long period of time. In addition, doloma ball mill fines may also be included. Ball mill fines are small enough to pass through a 325 U.S. standard mesh and can be defined as particles having a surface area-to-weight ratio of 2300 $Cm^2$/gm to 2800 $Cm^2$/gm. A suitable doloma is a powder having particles ranging in size from 0.15 mm to 1.4 mm in diameter and which may further include doloma ball mill fines. Minor amounts of impurities may be tolerated in the doloma. However, it is preferable to minimize such impurities. Preferably, the doloma should contain a minimum of 56.5% CaO, 41.5% MgO and a maximum of 2% other impurities with a maximum of 1% $Fe_2O_3$. An analysis of a preferred doloma is shown below in Table 2.

TABLE 2

| Specie | wt. % |
| --- | --- |
| CaO | 56.7 |
| MgO | 41.2 |
| $Al_2O_3$ | 0.5 |
| $SiO_2$ | 0.4 |
| $Fe_2O_3$ | 1.2 |

Preferably the density of the doloma is from 3.25 to 3.28 grams/cubic centimeter. Thus, the doloma should be sintered until the bulk density of the grain is a minimum of 3.25 grams/cubic centimeter. Preferably the total porosity, open and closed, should not exceed 5%. The preferred particle size distribution of the doloma fraction contained in the nozzle is 150 microns–1300 microns with the ball mill fines having a statistical mean particle diameter of 7.2 microns. In another preferred embodiment, the doloma includes a fraction having a particle size range from 0.15 mm–1.4 mm in diameter (coarse fraction) and a ball mill fines fraction. In this preferred embodiment, the coarse fraction of doloma should be in the range from about 32 wt. % to about 43 wt. % with respect to the solids blend. The solids blend includes all the solid material (e.g., graphite and doloma) and excludes the resin, solvent and resin coreactant reactant. In this preferred embodiment, the ball mill fines fraction may range from 20–25 wt. % of the solids blend.

The solids blend may further include other oxides which are compatible with CaO and MgO. Such oxides include silica ($SiO_2$), zirconia ($ZrO_2$), hafnia ($HfO_2$), ceria ($CeO_2$), titania ($TiO_2$) and magnesia (MgO). These oxides should be below 25 wt. % of the solids blend, preferably no more than 10 wt. % and most preferably no more than 5 wt. %. The amount of MgO may exceed 1% (e.g., more than 1% up to 10% or more than 1% up to 5%). In addition, effective amounts of known antioxidants used in refractory nozzles may also be included in the solids blend. Suitable antioxidants can include the metal powders of aluminum, silicon, boron, calcium and magnesium or the carbides of silicon, calcium, zirconium, boron, tantalum and titanium. Some low melting oxides such as boric oxide, sodium borate or any combination of glass formers—aluminum, silicon, boron, phosphorous and zirconium oxides can be added to the body in order to form a protective layer on the surface to ban the ingress of oxygen into the body. This oxygen will destroy the bond carbon, and therefore, must be prevented from doing so by some barrier layer. The additions of metals or glass-forming oxides or carbides accomplish this. These materials are added in antioxidant effective amounts to protect the nozzle from oxidation particularly when the nozzle is hot.

The nozzles and related articles are made by conventional molding techniques. First, the solid blend containing the doloma, graphite and optional metal oxide additives and optional antioxidant additives are mixed. Next, the resin is added to the dry solid blend and the ingredients are mixed in an agglomerating mixer to form agglomerates. Preferably the agglomerates have a normal size distribution centered around 400 microns with no agglomerates being greater than about 2000 microns and none being finer than about 150 microns. The agglomerates are formed in the mixing operation when the solids blend is wet blended with the resin. For example, in a preferred embodiment, the agglomerates are formed by wet mixing the solids blend with the resin solution along with the co-reactant. Densification of the agglomerates occurs during the mixing operation through viscosity enhancement of the resin which occurs when the volatile liquids evaporate and the resin and co-reactant react with each other. Preferably, the bulk density of the agglomerates should not be less than 1.65 grams/cubic centimeter, more preferably from 1.9–2.1 grams/cubic centimeter. Such agglomerates, when pressed at 10000 PSI, will form an article having a bulk density of 2.37–2.45 grams/cubic centimeter.

The agglomeration is best performed at ambient temperature with only a gradual and limited amount of warming which occurs due to the mixing and slight exothermic reaction which occurs as the resin cures. Preferably the material being agglomerated should not be allowed to exceed a temperature more than about 140° F. and the rate of temperature increase should be no more than about 3° F. per minute.

The agglomerates are placed in a mold (e.g., rubber mold) and formed at high pressure, e.g., 8500 PSI (580 bar) to 25000 PSI (1700 bar) to form the shaped structure having a bulk density in the range of 2.35–2.45 grams/cubic centimeter which is a preferred density for operation in a metal casting procedure. An isostatic press with rubber tooling may be used for the molding operation. After molding, the shaped structure is heated in the absence of oxygen (e.g., in an atmosphere of nitrogen or argon) at a high temperature (e.g., 975–1375° C.) until the resin bond is converted to a carbon bond. The articles in this coked state will have the required physical characteristics to permit successful use as nozzles and the like for casting molten metal.

There may be wide variation in the amount and proportion of the solid materials which are used to form the nozzles and similar articles of this invention. Generally, the doloma (including ball mill fines) can vary from 30–70% based upon the weight of the solids blend. Unless otherwise stated, all percentages given herein are percentages by weight.

There should be at least about 25 wt. % graphite in the solids blend. There is no upper limit to the amount of graphite as long as there is sufficient doloma to avoid the clogging problem. However, it is preferred to limit the graphite to no more than 45% to avoid excessive erosion associated with nozzles containing a large amount of graphite. Thus, in a preferred embodiment, the graphite can vary from about 25 wt. % to about 45 wt. % based upon the weight of the solids blend, more preferably about 30% to about 45% by weight. However, in order to combine the anticlogging advantage with the desired thermal shock resistance required for adequate performance, the graphite content should be greater than 33% (e.g., greater than 35%) to about 43%, preferably about 37–43% and most preferably about 38% and the doloma should be in the range of 37–63 wt. % based upon the weight of the solids blend.

Examples of suitable carbon bonded doloma/graphite nozzles have been made from the compositions shown in Table 3 which shows the parts by weight for each ingredient utilized.

TABLE 3

|  | Example 1 | Example 2 | Example 3 | Example 4 | Example 5 | Example 6 |
|---|---|---|---|---|---|---|
| Graphite 0.3 mm–0.15 mm dia. | 38 | 30 | 38 | 30 | 45 | 38 |
| Graphite 0.15 mm–0.044 mm | 0 | 8 | 0 | 8 | 0 | 7 |
| Calcined Doloma 0.42 mm–0.15 mm | 7 | 7 | 37 | 37 | 0 | 12 |
| Calcined Doloma 1.4 mm–0.15 mm | 30 | 30 | 0 | 0 | 37 | 25 |
| Calcined Doloma Ball Mill Fines | 25 | 25 | 25 | 25 | 25 | 25 |
| Liquid Resin | 10 | 10 | 10 | 10 | 10 | 10 |
| Basic Co-reactant | 1 | 1 | 1 | 1 | 1 | 1 |

In examples 1–6, the dry ingredients (graphite, doloma and ball mill fines) are dry mixed to form a blend which is then wet mixed with the resin and co-reactant. Mixing is continued to form agglomerates of the cured resin and solid particles. These agglomerates are placed in a rubber mold and formed at high pressure (e.g., 8500–25000 PSI). Next, these parts are then heated in the absence of oxygen until the resin is converted to a carbon bond. The parts in this coked state have desirable physical properties to permit successful use as pouring tubes or nozzles.

Although the resin used to bind the doloma-graphite is selected to minimize the liberation of water during the curing reaction, nonetheless, enough water is liberated to produce the expansile tendency noted above with respect to the resin bonded doloma-graphite material. Typical resins used for the doloma graphite nozzle and which are also used in the zirconia/graphite material of the sleeve include phenolic novalak resin dissolved in furfuraldehyde or furfuryl alcohol. Other suitable solvents for the phenolic novalak resin include methyl alcohol, ethyl alcohol and ethylene glycol. Conventional phenolic resole resins may also be used.

In a preferred embodiment, partially stabilized zirconium oxide (either CaO or MgO stabilized) 80%–90%, graphite 10%–20%, antioxidants such as Si, SiC etc. 5%–10%, CaO or doloma 5%–15%, and phenolic resin solution 10%–20%, are mixed together to form an agglomerate. The phenolic resin solution typically contains 40%–60% by weight of resin. Any conventional agglomerating type mixer may be used such as an Eirich R type or a Littleford F type mixer. The green pressed properties of the agglomerate should have a bulk density of 3.5–3.8 gms/cm$^3$. The agglomerate is then co-molded with the doloma/graphite to form a nozzle having the sleeve structure as shown in FIG. 1. The nozzle is then subjected to thermal treatment and the resin is converted to a resite without any cracking of the zirconia-graphite reinforced zone (sleeve).

Although the embodiment described above includes antioxidants, it is not essential for such antioxidants to be included in the material used to make the sleeve.

In a preferred embodiment the following ingredients were blended to form material which was used to form a sleeve in accordance with the present invention:

| | |
|---|---|
| graphite | 12% |
| zirconium oxide | 83% |
| doloma | 5% |
| phenolic resin solution (50% by weight resin in furfuraldehyde solvent) | 11% |

A resin bonded doloma-graphite nozzle fabricated with a sleeve having the above composition resisted cracking upon curing of the resin so as to convert the resin to resite.

While the present invention has been described in terms of certain preferred embodiments, one skilled in the art will readily appreciate that various modifications, changes, omissions, and substitutions may be made without departing from the spirit thereof. It is intended, therefore, that the present invention be limited solely by the scope of the following claims.

What is claimed is:

1. In a composition for forming a slagline sleeve which comprises zirconium oxide, graphite and resin binder capable of forming a resite during a curing reaction which liberates water, said zirconium oxide optionally containing a stabilizing amount of CaO within the crystalline structure thereof
   wherein the improvement comprises an effective amount of CaO containing powder incorporated in said composition to counteract contractile forces which develop when said resin is cured to form said resite; said CaO of said CaO containing powder being reactive with said water liberated during the curing reaction to form hydrated calcium oxide and said CaO of said CaO containing powder being separate and distinct from the crystalline structure of said zirconium oxide.

2. The composition of claim 1 wherein said CaO containing powder is selected from the group consisting of dead burned lime and doloma.

3. The composition of claim 2 which further comprises a stabilizing amount of CaO or MgO within the crystalline structure of the zirconium oxide.

4. The composition as claimed in claim 2 wherein the CaO of said CaO containing powder is present in an amount of 0.25–10 weight percent based upon the amount of zirconium oxide and graphite contained in said composition.

5. The composition of claim 2 which comprises a solids blend mixed with said resin; said solids blend comprising 12% by weight of graphite, 83% by weight of zirconium oxide and 5% by weight of doloma; said resin being a phenolic resin solution which comprises furfuraldehyde containing 50% by weight of phenolic resin dissolved therein; said phenolic resin solution being present in said solids blend in an amount of 11% by weight based upon the weight of said solids blend.

6. In a method for making a nozzle for pouring molten metal, said nozzle comprising a body portion and a slagline sleeve portion attached thereto;
   said body portion having a shape which includes an exterior surface and an inner surface region wherein said inner surface region defines a bore extending therethrough for the passage of molten metal;
   said slagline sleeve portion being located around at least a circumferential portion of said exterior surface for contact with a slag layer in a continuous casting mold;
   said method comprising forming said body portion by molding a first mixture containing resin binder, graphite and metal oxide refractory particles, into the shape of said body portion and then curing the resin of said first mixture; and
   forming a second mixture which comprises zirconium oxide, graphite and resin binder capable of forming a resite during a curing reaction which liberates water, coating said second mixture onto at least a circumferential portion of said exterior surface and then curing said resin of said second mixture to form a resite, said zirconium oxide optionally containing a stabilizing amount of CaO or MgO within the crystalline structure thereof;
   wherein the improvement comprises the further inclusion of an effective amount of CaO containing powder in said second mixture to counteract contractile forces which develop when said resin of said second mixture is cured to form said resite, said CaO of said CaO containing powder being reactive with said water liberated during the curing reaction to form hydrated calcium oxide and said CaO of said CaO containing powder being separate and distinct from the crystalline structure of said zirconium oxide.

7. The method of claim 6 wherein said first mixture comprises doloma, graphite and resin binder.

8. The method of claim 7 wherein said CaO containing powder is selected from the group consisting of dead burned lime and doloma.

9. The method of claim 8 wherein said second mixture further comprises a stabilizing amount of CaO or MgO within the crystalline structure of the zirconium oxide.

10. The method of claim 8 wherein the amount of CaO of said CaO containing powder is present in said second mixture in an amount of 0.25–10 weight percent based upon the amount of zirconium oxide and graphite contained in said second mixture.

11. The method of claim 9 wherein said second mixture comprises a solids blend mixed with said resin; said solids blend comprising 12% by weight of graphite, 83% by weight of zirconium oxide and 5% by weight of doloma; said resin being a phenolic resin solution which comprises furfuraldehyde containing about 50% by weight of phenolic resin dissolved therein; said phenolic resin solution being present in said solids blend in an amount of 11% by weight based on the weight of said solids blend.

12. The nozzle made by the process of claim 6.

13. The nozzle made by the process of claim 7.

14. The nozzle made by the process of claim 8.

15. The nozzle made by the process of claim 9.

16. The nozzle made by the process of claim 10.

17. The nozzle made by the process of claim 11.

18. The nozzle of claim 12 which has been subjected to carbonizing conditions whereby the resin of said first and second mixtures is carbonized thus forming a carbon matrix in said body portion and said slagline sleeve portion.

* * * * *